United States Patent [19]

Shapiro et al.

[11] 3,863,807

[45]

[54] LIQUID DISPENSING AND TRANSFER DEVICE

[75] Inventors: Justin Joel Shapiro, Berkeley; John W. G. Chin, Richmond, both of Calif.

[73] Assignee: said Shapiro, Berkeley, Calif. ; by said Chin

[22] Filed: Feb. 20, 1974

[21] Appl. No.: 444,176

[52] U.S. Cl............... 222/43, 128/218 C, 222/49, 222/309
[51] Int. Cl............................................ G01f 11/06
[58] Field of Search............ 222/43, 44, 46, 49, 50, 222/309, 383, 384, 385; 128/218, 273

[56] References Cited
UNITED STATES PATENTS

| | | | |
|---|---|---|---|
| 2,792,157 | 5/1957 | Gilman | 222/309 |
| 2,798,647 | 7/1957 | Broadwin | 222/309 |
| 2,952,255 | 9/1960 | Heim | 128/218 C |
| 3,730,398 | 5/1973 | Goda | 222/309 |

*Primary Examiner*—Robert B. Reeves
*Assistant Examiner*—Larry H. Martin
*Attorney, Agent, or Firm*—Herman L. Gordon

[57] ABSTRACT

A dispensing and transfer pipet having a calibrated barrel and a thumb-actuated dispensing plunger. The plunger has a connection rod extending parallel to the barrel and adjustably attached thereto is a transparent collar member slidably mounted on the barrel and having an index line overlying the calibrations on the barrel. A spring biases the plunger upwardly to bring the collar member against and within a finger grip and guard member installed on the top portion of the barrel. The finger grip and guard member has opposite laterally extending finger-engaging wings and a pair of depending spaced parallel guard flanges between which the transparent collar member is receivable. The normal position of the plunger above the bottom of the barrel, and hence the total intake volume of the pipet, can be set by adjusting the connection of the transparent collar member to the connection rod, for which purpose a manually operated thumb screw is provided. The pipet may be employed either with a liquid container having suitable dispensing check valves and an outlet dispensing conduit, or alternatively, with a liquid transfer syringe vessel.

7 Claims, 5 Drawing Figures

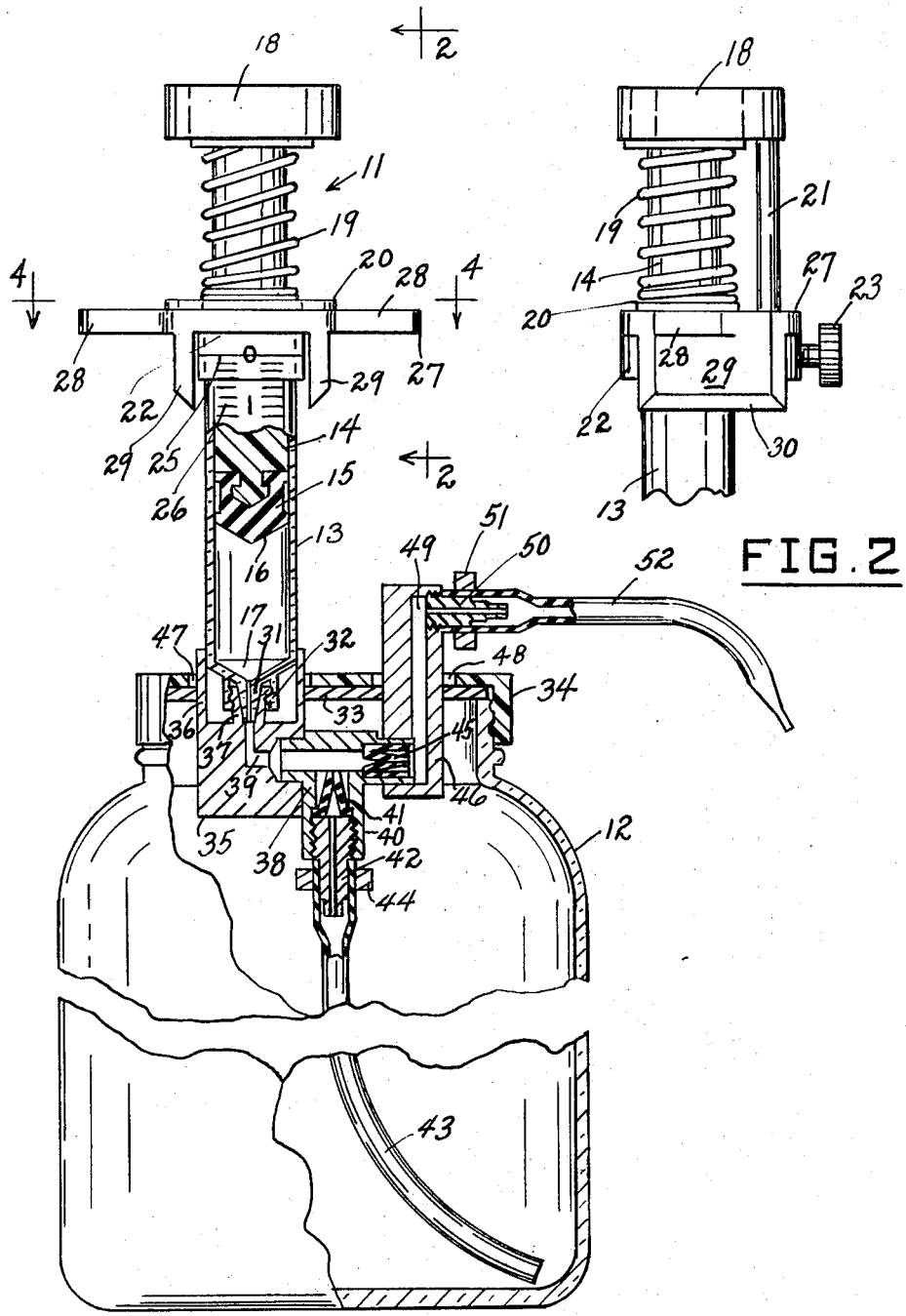

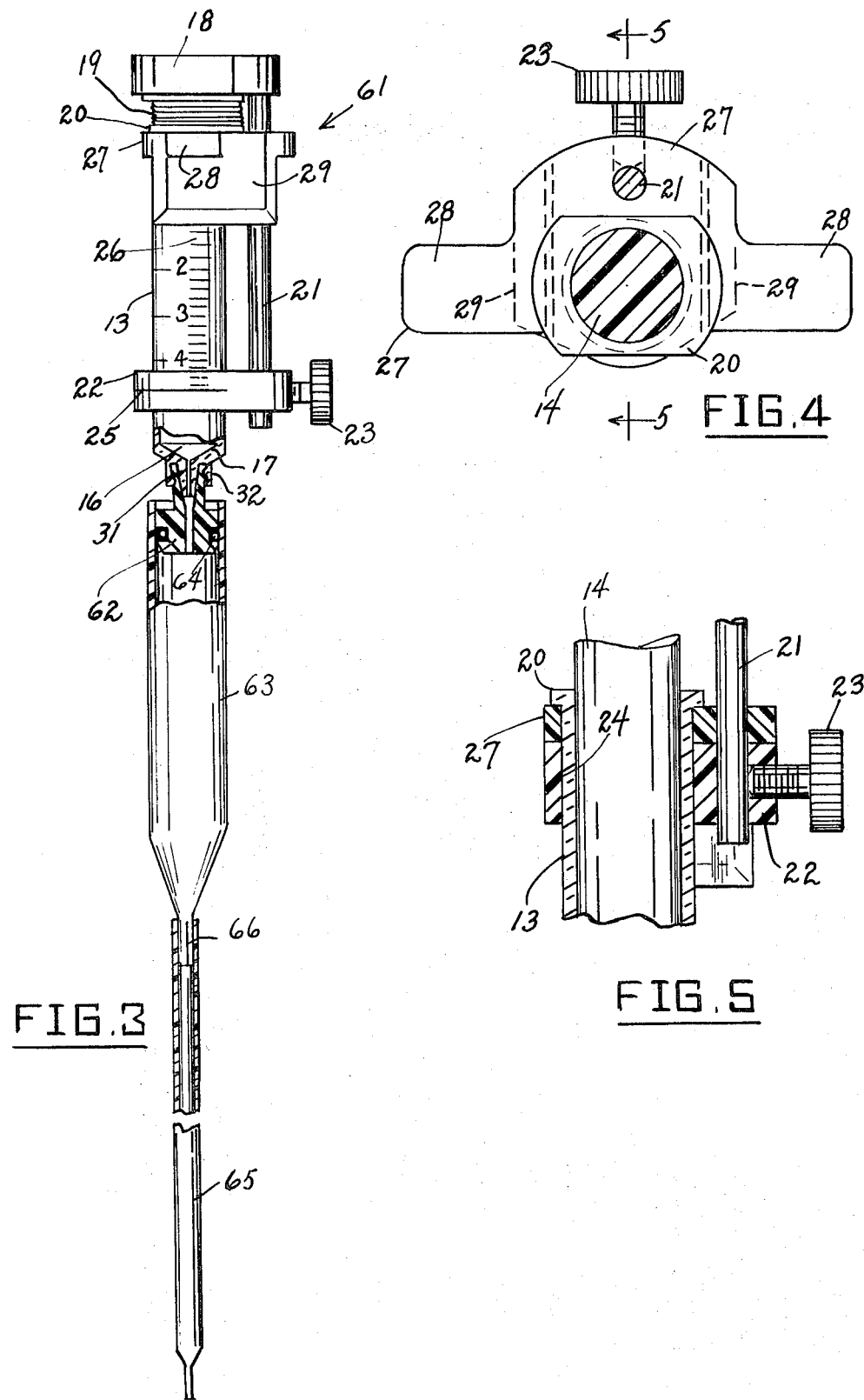

LIQUID DISPENSING AND TRANSFER DEVICE

This invention relates to pipet devices, and more particularly to dispensing and transfer pipets of the manually operated type employed for accurately dispensing liquids or for sampling or transferring accurately measured quantities of liquid.

A main object of the invention is to provide a novel and improved pipet apparatus which is simple in construction, which is easy and safe to use, and which is especially suited for the repetitive dispensing or sampling of liquids.

A further object of the invention is to provide an improved pipet device which can be used as a liquid dispensing device to dispense accurately measured quantities of liquid from a container, such as a wide-mouth bottle or the like, and which can be easily and readily converted for use as a liquid sampling or transfer device for transferring accurately measured volumes of liquid.

A still further object of the invention is to provide an improved pipet device employing inexpensive components, being versatile in use, and which is easy to maintain in operating condition.

A still further object of the invention is to provide an improved pipet device of the manually operated, calibrated syringe type which is arranged so that air within the measuring system thereof may be completely expelled, which may be operated and transported with one hand, and which is adaptable for a wide range of uses in a laboratory.

A still further object of the invention is to provide an improved manually operated pipet device having a highly visible volume-indicating arrangement, wherein the volume-indicating member is movable on the barrel of the device, and wherein the user's fingers are protected from injury from the action of the moving indicating member.

Further objects and advantages of the invention will become apparent from the following description and claims, and from the accompanying drawings, wherein:

FIG. 1 is a front elevational view, partly in vertical cross-section, of an improved liquid dispensing device according to the present invention, used with a wide-mouth liquid container.

FIG. 2 is a fragmentary side elevational view of the upper portion of the assembly, taken substantially on the line 2—2 of FIG. 1.

FIG. 3 is a side elevational view, partly in vertical cross-section, of a dispensing device according to the present invention, employed as a transfer syringe and shown with its plunger in fully depressed position in the pipet barrel.

FIG. 4 is an enlarged horizontal cross-sectional view taken substantially on the line 4—4 of FIG. 1.

FIG. 5 is a fragmentary vertical cross-sectional view taken substantially on the line 5—5 of FIG. 4.

Referring to the drawings, and more particularly to FIGS. 1, 2, 4 and 5, 11 generally designates an improved pipet device according to the present invention, shown mounted for dispensing accurately measured quantities of liquid from a wide-mouth bottle 12. The device 11 comprises a syringe assembly including a barrel member 13 of suitable transparent or translucent material, such as transparent or translucent plastic material, provided with a plunger 14 having a bottom resilient deformable tip member 15 slidably and sealingly engaged in the barrel 13. Tip member 15 has a conical bottom end 16 which is conformably receivable in the conical bottom end portion 17 of barrel 13. An operating head 18 is suitably detachably secured on the top end of plunger 14, and a coiled spring 19 surrounds the upper exposed portion of plunger 14, bearing between head 18 and the top flange 20 of barrel 13, biasing the plunger upwardly.

A connection rod 21 is secured to and depends from head 18. Said connection rod extends parallel to barrel 13 and extends slidably through a finger grip and stop member 27 and through a transparent collar block 22, being adjustably secured to collar block 22 by a thumb screw 23, as shown in FIG. 5. Collar block 22 has a bore 24 which slidably receives barrel 13. At its front side, transparent collar block 22 is inscribed with a horizontal index line 25 which overlies a volume scale 26 provided on barrel 13. In its normal uppermost position index line 25 registers with the zero marker on scale 26, the numerical scale values increasing downwardly from said zero marker.

The finger grip and stop member 27 is secured on barrel 13 immediately subjacent to flange 20, said member 27 having the opposite laterally extending wing elements 28,28 and having the parallel depending rectangular guard flanges 29,29 between which the collar block 22 is receivable in the normal positions of the parts, as shown in FIG. 1. The guard flanges 29,29 are of a vertical depth substantially greater than the vertical depth of the collar block 22 and extend rearwardly well beyond the connection rod 21, as shown in FIG. 2. The flanges may be outwardly bevelled at their front, rear and bottom edges, as shown at 30.

As will be apparent from FIGS. 1 and 2, the working stroke of plunger 14, corresponding to the volume between tip 16 and bottom wall 17, may be established by the adjustment of the position of rod 21 relative to the collar block 22, this adjustment being locked by tightening thumb screw 23. The adjusted filling volume is set and will be indicated by index line 25 on scale 26 with the tip 16 engaged against bottom wall 17 in the fully depressed position of plunger 14, for example, as shown in FIG. 3.

The syringe barrel 13 is integrally formed with the tapered bottom discharge spout 31 surrounded by a depending locking sleeve 32, for example, an internally threaded sleeve, or the like, adapted to be lockingly engaged with a complementary male-threaded conduit. In the arrangement shown in FIG. 1, a cover disc 33 is sealingly clamped on the top rim of the wide-mouth bottle 12 by a screw-threaded cover cap 34. Sealingly secured to the cover disc 33 is a conduit body member 35 having a cylindrical hollow top portion 36 provided with an upstanding central externally threaded conduit fitting element 37 which receives the tapered spout 31 and lockingly engages in the sleeve element 32, forming a sealed conduit connection with the spout. A T-connection member 38 has one end of its head portion connected to conduit body 35 in communication with the passage 39 thereof. The depending stem portion 40 of member 38 is provided with an upwardly opening normally closed flexible check valve element 41 and a depending conduit nipple 42 to which a depending flexible intake conduit 43 is connected and to which it is clampingly secured by a clamping ring 44. The other end of the head portion of T-member 38 is provided with a rightwardly-opening normally closed flexible check valve element 45 and is connected to the bottom end of a vertical conduit body 46 sealingly secured to and extending upwardly through cover disc 33. Cap 34 has respective relatively large apertures 47 and 48 through which the members 36 and 46 extend.

Removably connected to the top end of conduit body 46 in communication with the conduit passage 49 thereof is the rightwardly directed outlet nipple 50, and clampingly connected thereto by a clamping ring 51 is a flexible outlet conduit 52.

As shown in FIG. 1, the flexible intake conduit 43 is preferably of sufficient length to reach a bottom corner portion of bottle 12 to facilitate complete emptying of the liquid contents of the bottle.

With clamping ring 51 and flexible outlet tube 52 detached, and cover cap 34 unscrewed from bottle 12, the disc member 33 may be removed, providing convenient access to the parts carried thereby for cleaning, replacement or repair.

In operation, with liquid in the bottle 12, the system is first primed by depressing plunger 14 and releasing same one or more times to fill member 38 and space 39, then detaching the syringe barrel 13 from element 37, then depressing the plunger fully so as externally to completely empty the barrel, and then reconnecting the empty syringe to the valve system at the connection 32,37, holding the plunger depressed. Upon release of the plunger, the desired measured quantity of liquid from bottle 12 will be drawn into the barrel through the primed member 38, valve element 45 remaining closed and valve element 41 opening. Upon fully depressing the plunger, this measured quantity will be discharged at the dispensing conduit 52, valve element 45 opening and valve element 41 remaining closed. Such measured quantities may be repetitively dispensed by repeatedly depressing the plunger fully and releasing same. To perform the dispensing operations the user places two fingers respectively beneath the wings 28,28 and employs his thumb to depress the plunger head 18. The guard flanges 29,29 prevent the user's fingers from being pinched by the return movement of the collar block member 22 as it rises to its upper limiting position between the guard flanges upon release of head 18.

Referring to FIG. 3, an assembly employed as a transfer pipet or sampler is designated generally at 61. This assembly comprises a syringe unit similar to that employed in the embodiment of FIG. 1, except that the scale 26 thereof may be somewhat longer to compensate for the weight of the sampled liquid. An adapter plug 62 is sealingly attached to the bottom spout 31 of barrel 13 in the same manner as conduit body member 35 in the previously described embodiment shown in FIG. 1. Plug member 62 is sealingly engaged in the top end of a disposable tip 63, the plug member having a peripheral groove containing an O-ring 64 to provide an air-tight fit. The fit is sufficiently tight to support tip 63 and its contents from the hand-held syringe assembly. The syringe is used in this embodiment to displace air only, the plunger being depressed to a position to indicate (by index line 25 on scale 26) the volume of expelled air, and hence the volume of liquid to be transferred or sampled. Thus, with tip 63 inserted in the liquid reagent with the surface of the reagent exposed to atmospheric pressure, the indicated volume of said reagent will be drawn into the tip 63 when the fully depressed plunger is released. The said volume of reagent is discharged externally be depressing the head 18 fully with the operator's thumb, with two respective fingers engaged beneath the wing elements 28,28.

For reaching into deep vessels, an extension tube 65 may be attached to the bottom spout 66 of tip 63, as shown in FIG. 3.

As in the previously described embodiment, the guard flanges 29,29 protect the operator's fingers from being pinched by the rising collar block 22 when head 18 is released.

In the above-described embodiments of the invention the transparent collar block 22, which slidably engages around the barrel 13, serves not only as a carrier for the volume index marker line 25, but also as a stabilizing means for the plunger 14, since it acts as a guide to maintain the axis of the plunger in alignment with the axis of the barrel 13. The finger grip and stop member 27, connecting rod 21, transparent collar block 22, and syringe barrel 13, maintain alignment of transparent collar block 22 within the guard flanges 29, 29 of finger grip and stop member 27.

While certain specific embodiments of liquid dispensing devices have been disclosed in the foregoing description, it will be understood that various modifications within the spirit of the invention may occur to those skilled in the art. Therefore, it is intended that no limitations be placed on the invention except as defined by the scope of the appended claims.

We claim:

1. A liquid dispensing device comprising a barrel having fluid conduit means at one end, a scale on said barrel, a movable plunger in said barrel and extending from its other end, a collar member surrounding, slidably engaging, and being longitudinally movable on said barrel, index means on said collar member arranged to overly said scale, a connection rod extending parallel to and adjacent said barrel, means rigidly connecting said connection rod to the external portion of said plunger, means to rigidly connect said connection rod to said collar member, whereby said index means moves relative to said scale in accordance with the positioning of the plunger in said barrel, spring means biasing the plunger outwardly relative to the barrel, and stop means on the barrel engageable by said collar member to limit extension of the plunger, wherein said stop means includes a pair of opposite laterally outwardly extending finger-grip wing elements, and wherein said stop means includes a pair of depending finger guard flanges inwardly adjacent said wing elements, said collar member being receivable between said guard flanges.

2. The liquid dispensing device of claim 1, and wherein the means to rigidly connect the connection rod to said collar member comprises means to adjust the position of said collar member along the connection rod.

3. The liquid dispensing device of claim 1, and wherein said connection rod extends through said collar member and wherein said means to rigidly connect the connection rod to the collar member comprises a clamping screw threadedly engaged in the collar member and being clampingly engageable with the connection rod, whereby the collar member may be adjusted in position along the connection rod.

4. The liquid dispensing device of claim 3, and wherein said depending finger guard flanges extend rearwardly sufficiently to receive the connection rod therebetween.

5. The liquid dispensing device of claim 1, and a liquid reservoir provided with removable top cover means, a dispensing valve assembly mounted subjacent said top cover means, said valve assembly including intake conduit means depending into the reservoir and externally extending discharge conduit means, said dispensing valve assembly having a flow passage, means to connect said first-named fluid conduit means to said flow passage, and respective intake and discharge check valve elements between the depending conduit means and the flow passage and between the flow passage and the externally extending discharge conduit means.

6. A liquid dispensing device comprising a barrel having fluid conduit means at one end, a scale on said barrel, a movable plunger in said barrel and extending from its other end, a collar member surrounding, slidably engaging, and being longitudinally movable on said barrel, index means on said collar member arranged to overly said scale, a connection rod extending parallel to and adjacent said barrel, means rigidly connecting said connection rod to the external portion of said plunger, means to rigidly connect said connection rod to said collar member, whereby said index means moves relative to said scale in accordance with the positioning of the plunger in said barrel, an enlarged operating head member on the top end of the plunger, spring means surrounding the plunger and bearing between the top of the barrel and said operating head member, biasing the plunger upwardly, a stop member mounted on the top portion of the barrel, said stop member being engageable by the collar member to limit upward extension of the plunger and being provided with opposite outwardly extending finger-grip wing elements, and a pair of finger guard flanges depending from said stop member inwardly adjacent said wing elements and being spaced apart to receive the collar member therebetween.

7. A liquid dispensing device comprising a barrel having fluid conduit means at one end, a movable plunger in said barrel and extending from its other end, a collar member surrounding, slidably engaging, and being longitudinally movable on said barrel, a connection rod extending parallel to and adjacent said barrel, means rigidly connecting said connection rod to the external portion of said plunger, means to rigidly connect said connection rod to said collar member, whereby said collar member moves relative to said barrel in accordance with the positioning of the plunger in said barrel, and finger-gripping means on the barrel including depending guard flange means adjacent opposite sides of the barrel and spaced therefrom to at times receive said collar member therebetween.

* * * * *